Figure 1:
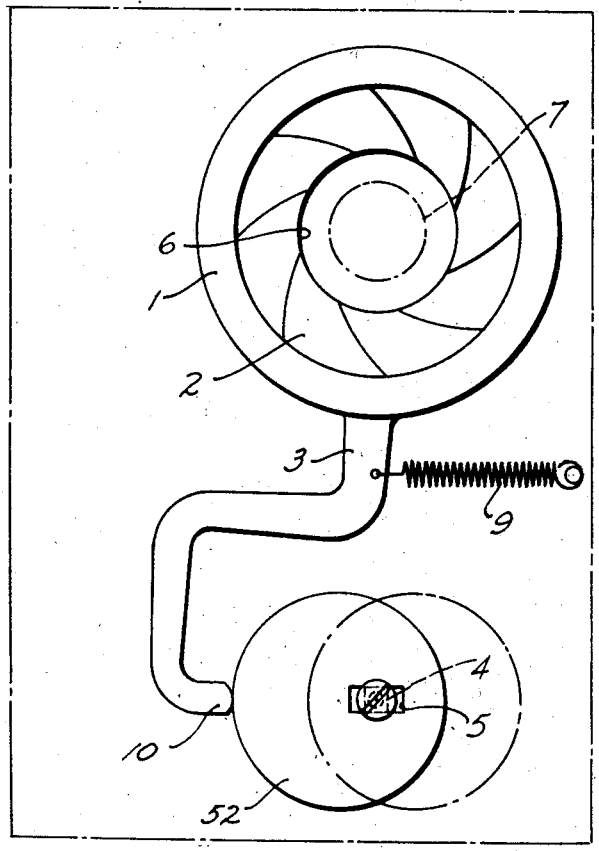

June 29, 1943.　　　I. M. TERWILLIGER　　　2,322,752

MOTION PICTURE FILM

Original Filed Jan. 6, 1938　　　2 Sheets-Sheet 1

INVENTOR.
Ivan M. Terwilliger,
BY Robert W. Fulwider
ATTORNEY.

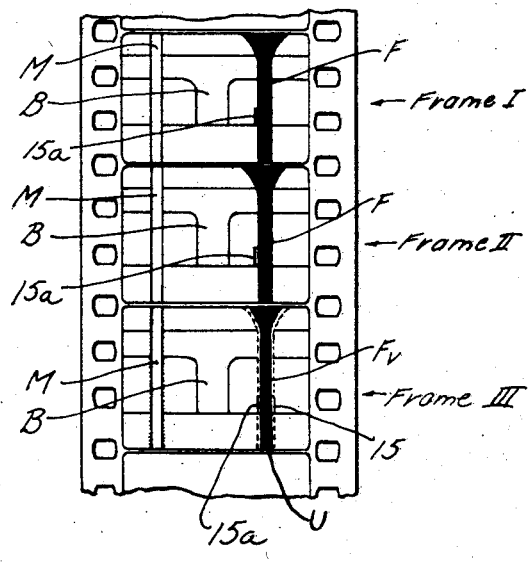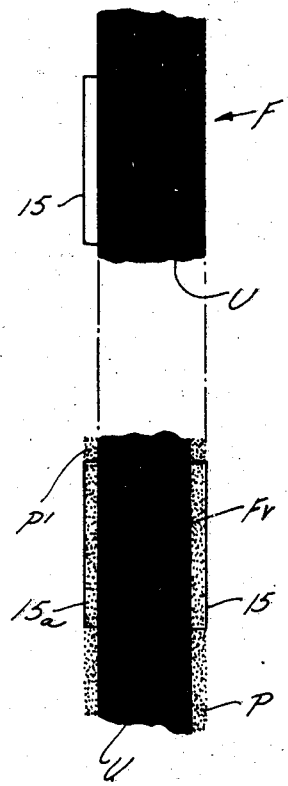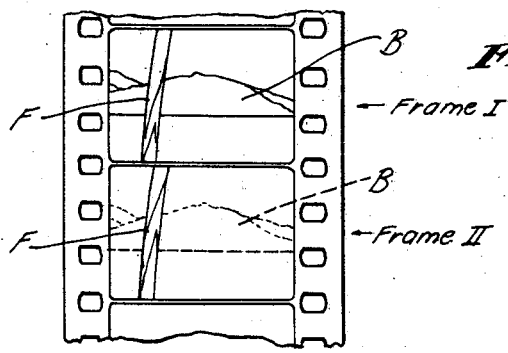

Patented June 29, 1943

2,322,752

UNITED STATES PATENT OFFICE 2,322,752

MOTION PICTURE FILM

Ivan Melville Terwilliger, Altadena, Calif.

Continuation of application Serial No. 183,696, January 6, 1938. This application August 12, 1939, Serial No. 289,877

9 Claims. (Cl. 88—16.6)

My invention relates generally to the art of cinematography, and more particularly to the production of pictures which, when projected upon a screen, give the illusion of depth.

This application is a continuation of my application Serial No. 183,696, filed January 6, 1938, which was in turn a continuation-in-part of my prior application Serial No. 612,897, filed May 23, 1932, and since matured into Patent No. 2,104,779, dated January 11, 1938.

In my said issued patent, I disclose a method and apparatus for producing a single continuous film bearing a series of successive images, certain of which are produced when the camera is at one distance from the objects photographed, while others of which are produced when the camera is at a different distance from the objects, and in which the variation in size of the images of any given object produced at the different distances is compensated for to produce a film in which all of the images are in substantially the same positions on the film and are substantially the same size.

Said patent also discloses a method of photographing a series of images of foreground and background objects upon a single film strip with both foreground and background objects in focus, and then photographing a second series of images of the same objects on the same fixed optical axis, with the foreground objects in sharp focus, and the background out of focus, and then intermingling the exposures of the two series, whereby the objects in one plane of the field predominate over those in another plane of the field. It is also mentioned in said patent that these and the other effects disclosed therein may be enhanced by recurrently fluctuating the size of the camera iris in synchronization with successive exposures.

It is also an object of my invention to provide a film carrying a plurality of intermingled images having different depths of field, said images being arranged in various orders or combinations.

It is also an object of my invention to provide such a film in which one series of images having a certain depth of field predominate over other series of images having a different depth of field.

Some of the advantages of this type of film which I term "steropattern" include the production of the illusion of depth and plasticity of relief, increased roundness in the image, harmonious blending between images of objects at different depths of the field, and a coherent fusion of the variant aspects of the pictures seen upon projection.

Another object of my invention is to provide a film strip of the character mentioned, in which a given portion of each image is in registration with the same portion of the other images carried in other frames along said film strip.

Figure 2:
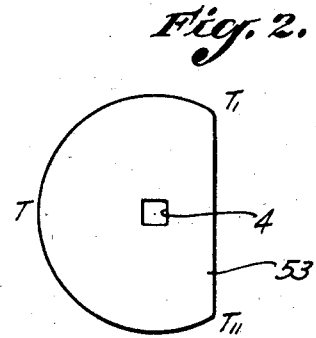
Figure 3:
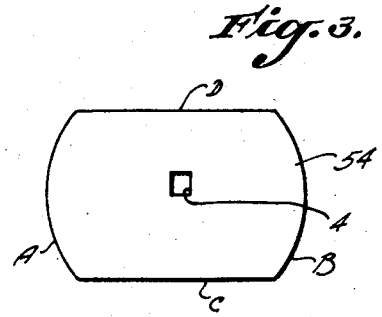
Figures 4, 6:
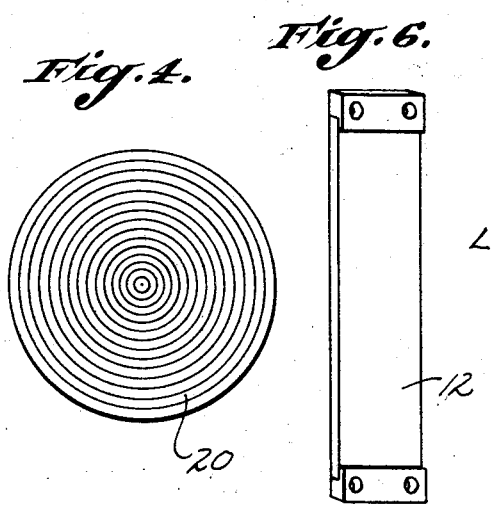
Figure 5:
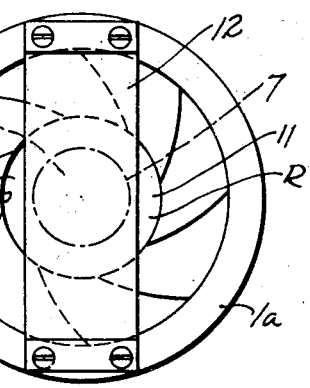

These and other objects and advantages of my invention will become apparent from the following description of a preferred form thereof, and from the accompanying drawings illustrating that form, in which:

Fig. 1 is a front elevation of a camera lens mount and iris control means, illustrating one form of apparatus which may be used to produce the film of my invention, Figs. 2 and 3 illustrate optional forms of cams for the apparatus of Fig. 1, Fig. 4 is a front elevation of a diffusion plate, Fig. 5 is a partial front elevation of a lens mount and auxiliary optical element usable in the production of the film of my invention, Fig. 6 is a perspective of said optical element, Fig. 7 is a fragmentary view of a film strip constituting one form of my invention, Fig. 8 is a fragmentary view of another type of film constituting a modification of my invention, and Fig. 9 is an enlarged fragmentary view of a part of Fig. 7.

Referring to the drawings, and particularly to Fig. 1 thereof, the numeral 1 indicates a suitable frame or mount for an iris 2 of a motion picture camera, the housing of which is indicated by broken lines. The iris is disposed immediately adjacent to the lens elements of the camera, either in front or rear thereof, or at the nodal point of the lens when it comprises a plurality of elements. Examples of satisfactory extreme positions to be assumed by the iris opening in producing the film of my invention are indicated by the full line circle 6 and the dotted circle 7, the numeral 6 indicating the larger opening position and the numeral 7 indicating the smaller or contracted iris position.

The iris 2 may be provided with a control arm 3 which, in the form illustrated in Fig. 1, is provided with a contact point or finger 10 adjacent its lower end for a purpose to be hereinafter shown. The iris control arm 3 is held by a spring 9 which continually urges it against a cam 52.

The camera is provided with a shaft 4 which is connected by gears not shown to the main drive shaft of the camera and is synchronized with the film-advancing mechanism thereof. The cam 52 is provided with a radial slot 5, by means of which it is mounted on shaft 4 for rotation therewith, it being noted that the cam 52 is mounted eccentrically on the shaft 4 and that by virtue of the slot 5, its lateral position with respect to the shaft may be varied, suitable means being provided for securing the cam to the shaft in the desired position. The cam 52 is of such size as to bear against the iris control arm contact point 10 at all times during its rotation, the spring 9 continually urging the point 10 into contact with the cam. Consequently, rotation of the cam 52 causes lateral movement of the contact point 10 and control arm 3 which results in a variation of the size of the iris 2. The gear connection between the drive shaft of the camera and the shaft 4 may provide various ratios of rotation, one suitable ratio being 2 to 1, whereby two frames of the film are caused to pass the exposure aperture for each revolution of the cam 52, so that one frame is exposed with the iris in its enlarged position, as illustrated for example by circle 6, and the successive frame is exposed through a contracted iris, for example as illustrated by circle 7. It will be understood, of course, that by varying the position of the cam 52 on the shaft 4 or by varying the diameter of the cam, the degree of the iris opening can be varied, and likewise it will be understood that different combinations of gears may be employed for the purpose of providing a different number of frame variations per cycle. It is essential however in all of these variations that the iris opening should always be large enough so that sufficient light is admitted to the camera to provide an adequate exposure of the complete frame area of the film under the particular photographing conditions. For example, it may be desired to vary the iris over three, four, or other number of frames so that a more gradual change is effected, which can be easily accomplished by properly proportioning the gear train. While the limits of variation of iris size may vary widely with different film sensitivities and other photographic conditions, I have found that varying the iris between stops f 2.0 and f 2.5 with the type of cam illustrated at 52 gives very satisfactory results in producing the film of my invention.

As previously mentioned, my invention comprehends various combinations of frames photographed with different iris openings. In Fig. 2, I have illustrated a modified form of cam 53 adapted to be mounted on the shaft 4 in place of the circular cam 52. It will be noted that cam 53 is circular for ⅔ of its perimeter, the other ⅓ comprising a chord of the circle. The letter T indicates the midpoint of the circular face of the cam and the letters T' and T'' indicate respectively the ends of the chord. By employing the proper gear train and correctly proportioning the cam 53, it can be made to rotate once for every three frames which pass the exposure aperture of the camera. Thus it will be seen that two of the three frames will be exposed while the iris is at a fixed position during the time which the control arm contact point 10 is following the circular portion of the cam T', T, T''. The third frame of the cycle will be exposed at a different iris opening, either larger or smaller as the case may be while the contact point 10 follows the cam surface between T''—T', it being further noted that during this latter exposure, the iris opening will make a complete cycle of wide to narrow to wide, or vice versa, depending upon the correlation between the cam and the control arm 3. In this manner, I produce a film having two successive frames with the same depth of focus followed by a frame having a different depth of focus. By assembling a plurality of these groups of frames to form a complete picture, I produce a film having a series of images photographed with a certain depth of focus, and another series of images photographed with a different depth of focus, the images of the different series being intermingled, it being understood of course that the number of images of either series may predominate over the other.

As is well known to those familiar with the art of photography, an exposure made through a small aperture will have a greater depth of focus than an exposure made through a larger aperture. By thus varying the depth of focus between frames, I provide on the frame exposed through the small aperture an image having more sharpness of contour and in which a greater number of objects in different planes of the field have a relatively distinct contour, while on those frames photographed through the larger aperture, I produce images in which fewer of the objects are clearly defined, and those objects located in planes of the field, distant from the plane of focus of the camera, are relatively diffused. By employing a cam such as 53, I produce twice as many pictures of one depth of focus as I do pictures of the different depth of focus, and consequently those pictures of the first depth of focus perdominate in number and effect upon the eye. In other words, I can product a film in which the images having greater average diffusion predominate over their counterpart images having greater average sharpness of contour or vice versa.

Furthermore, it will be apparent that the lens may be focused on any desired plane in the field, either foreground, middle ground, or background, and that this plane will always be in focus, even though the relative diffusion of the images may be varied. For example, the camera may be focused on the nearest foreground object which is maintained in sharp definition in all frames, and the definition of the background may be varied between sharpness and diffusion by varying the iris openings as previously explained. Conversely, the camera may be focused on the background, and the foreground images may be fluctuated between sharpness and diffusion on consecutive frames, or the camera may be focused on the plane of the middle ground and both the objects in the foreground and background may be varied in similar manner. I thus produce a film which on projection will vary the depth of focus within a scene of pictures, each individually harmonious, while maintaining a selected depth plane in relatively sharp focus throughout.

Referring now to Fig. 3, it is seen that I have there illustrated another type of cam indicated by the numeral 54 which is adapted to give a non-progressive variation or series of variations among frames. The cam 54 is likewise adapted to be rotated with the shaft 4 with a proper gear train which, for example may be proportioned so as to cause one complete rotation of the cam 54 for each four frames of film which are exposed at the aperture. The faces A and B may be the same and the faces C and D may be the same, but in this case, the cam should be eccentrically mounted on shaft 4 as indicated. The same result may be accomplished by having all of the cam faces different. In either event the order of the aperture sizes produced must be non-progressive. For example, assuming that the cam faces A, B, C, D will produce progressively larger aperture openings, the order of rotation should be A, D, B, C or other combination giving a non-progressive order of exposure aperture. In other words, each of the four frames of the cycle may be photographed through a different iris opening and consequently have a different depth of focus, these depths of focus varying in non-progressive relationship. By differently shaping and proportioning the cam faces, greater or lesser amounts of variation may be had between successive frames so that any particular type of image may be selected and made to predominate weakly or strongly. An unlimited number of combinations can be made in the film of my invention by choosing the proper type of cam and gear train to accompany the same, the particular combination chosen depending upon the type of subject photographed and the effect which it is wished to produce, it being borne in mind that projection of these various combinations will produce a complete picture having the illusion of depth.

As is well known, a thin negative, i. e. one exposed to a relatively small quantity of light has more contrast than a thick negative, i. e. one exposed to a greater quantity of light, providing all other factors are equal and the two films are developed the same. Thus it will be seen that by varying the iris opening for various frames, I not only produce a variation in the diffusion of the images photographed on successive frames, but also produce a variation in contrast from frame to frame. Since it is desirable that the projected images on the screen be of substantially uniform density so as not to cause eye strain by reason of sharp variations in the amounts of light projected on the screen, I prefer to print the negative obtained by my foregoing process in such a manner that the resulting positive obtained therefrom has substantially uniform density throughout. This may be done through use of the methods and apparatus disclosed in my copending application, Serial No. 34,924, filed August 6, 1935, and can easily be done by varying the printing lights so that the frames of the negative which are thin in density are printed with a lower printing light than are the thick density negative frames. By thus recurrently regulating the printing lights, I produce a positive which is substantially uniform in density, but in which the variations in definition and contrast present on the negative are carried into the positive, so that the plastic effect obtained by my film is retained.

In Fig. 4, I have illustrated a diffusion plate which can be placed over the iris when it is desired to secure special effects. This attachment comprises a plate of flat glass having concentric circles thereon, the plate being mounted on the camera so that the circles are coaxial with the optical axis of the lens and iris. Other types of diffusion means can be used, but I have found that the one illustrated is both simple and satisfactory. The amount of diffusion produced on the picture depends upon the number of concentric circles exposed before the lens, and consequently when the iris opening is reduced in size, and the number of concentric circles thereby exposed becomes less, the amount of diffusion becomes less and the picture photographed with the small iris opening will have much less diffusion than the one photographed with the large opening. Consequently, the pictures exposed through the small iris opening will be normally sharp with, of course, a relatively large depth of focus, while those photographed through the large iris will be relatively diffused and have a shallow depth of focus. By using my auxiliary attachment, it is possible to secure a greater variation in the amount of diffusion between the various frames with a relatively smaller variation in iris opening, it being remembered, of course, that if desired, the difference in diffusion between the said frames can be almost negligible or can be quite large as desired.

Since in a complete photoplay, there are many scenes and moods, it is possible to produce by my invention individual scenes with different characteristics which will properly portray the required mood, and cause a proper response in the viewer.

While the film of my invention as heretofore described produces upon projection a moving picture having a distinct plastic effect, I have found that by combining my system of varying the iris size with the system of photographing disclosed in my prior Patent No. 2,104,779 that I secure a different illusion of depth and plastic effect. According to the method of my said prior patent, the camera is moved along its optical axis between fixed positions nearer to and farther from the object being photographed, whereby different frames of the film are photographed at different distances from the field. Said patent also discloses with this camera movement the synchronized variation of the lens position with respect to the film, whereby the variation in size of particular objects which would normally attend movement of the camera is compensated for. The exposures from different camera distances may be either in progressive or non-progressive order, and the exposures from one view point may be greater in number than those from another, so that the images formed from one distance may predominate over the images formed from another distance in the same manner as the images photographed with one iris opening may predominate over the images photographed with another iris opening as hereinbefore described.

While I have found that the addition of means for varying the aperture to the camera described in my said patent provides an apparatus which produces very fine depth effects in one modification of that apparatus, I prefer to disconnect the focus synchronizing device of said camera and merely move the camera bodily back and forth without any compensatory movement of the lens with respect to the screen. In producing the film constituting a modified form of my invention, the camera is preferably focused on the background, so that the background plane is maintained at a substantially fixed size and position throughout the photographing of the entire scene, even though the camera is moved along its optical axis. The background objects, being much smaller than the foreground objects, are not materially changed in size or position by the movement of the camera along its optical axis, whereas the foreground objects are enlarged and in part displaced when the camera is moved to its forward position, and an exposure is made therefrom.

Referring now to Fig. 7 which illustrates a portion of a film showing one group of three frames photographed by this method, wherein frames 1 and 2 are photographed with the camera in its forward position with a relatively small aperture, and frame 3 is photographed by the camera in its rear position with a relatively wide aperture. The letter F in frame 1 indicates a foreground object; the letter B, the background; and the letter M, a middle ground object. In frame 3, the letters F—v indicate foreground image F which, because of its different characteristics, I term "F variant," and the letters B and M again indicate the background and middle ground, respectively. In frame 1, the numeral 15a indicates a portion of the background, and in frame 3, 15a represents the same portion of the background, while numeral 15 represents another portion of the background.

As mentioned, frame 1 was photographed with a relatively small aperture with the camera focused on the background, and consequently the background is clear and distinct and the foreground is relatively clear and distinct by reason of the increased depth of focus obtained by the small aperture.

When the camera is moved back, the background is relatively unchanged because of its distance from the camera, but the foreground image F is reduced in size somewhat, as indicated by F—v on the drawing. Likewise, by increasing the aperture size in this rearward position, the depth of focus is reduced, the circles of confusion are increased in size, and the foreground object F—v becomes considerably diffused as well as being slightly shifted in position nearer to the center of the film.

Fig. 9 is an enlarged view of that portion of the film carrying the images F and F—v of Fig. 7. By an inspection of this figure, it will be seen that on frame 1 the outline of F is sharp and the image is solid in density within the limits of its contour. On frame 3 the image F—v is likewise substantially of solid density throughout its center portion which I have termed the umbra U, but the density decreases around the contour in an enhanced vanishing fringe or shadow of progressively lesser density which I term the penumbra P. The image in frame 3 indicated by the numeral 15 is a fragment of the background which does not appear in frame 1, since it is hidden by the image F, but is brought into view in frame 3 by the change in critical angle of observation caused by the recession of the camera. However, by reason of the enhanced penumbra P, formed by the increase in size of the circles of confusion due to the decreased depth of focus of frame 3, the fragment 15 of the background is partially eclipsed by reason of the penumbra P of F—v. Likewise, the fragment 15a in the background seen in frame 1 is partially eclipsed by the penumbra P' on the other side of the image F—v.

Further inspection of Figs. 7 and 9 will show that while the umbra U of image F—v is positioned nearer the center of the picture, its enlargement by reason of the penumbra P has brought its outer limits substantially into line with the outer limits of image F of frame 1. However, on the opposite side of image F—v, the penumbra P' extends beyond the normal contour line of the inside of image F, and as mentioned, overlaps or interferes with the fragment 15a of the background.

The amount of the diffusion, i. e. the size of the penumbras P and P' in image F—v may be varied to different sizes by proper variation of the aperture size, so that image F—v may be larger or smaller or the same size as image F, thereby increasing or decreasing the factor of misregistration along a contour of the figure on projection of the images. It will also be noted that the image M of frame 1 has a slightly increased diffusion or penumbra in frame 3, since the change in position of the camera does not affect the middle ground of the picture as much as it does the foreground.

In photographing close-ups, it is advisable to have the principal foreground objects approximately in the center of the exposure aperture, so that the enlargements of the foreground by reason of the change in camera positions is substantially equal on both sides of the center of the picture, so that there will be substantially no displacements or misregistration between the foreground images in frame 1 and in frame 3. It will be understood of course that while I have illustrated a film having a predominance of sharp foreground pictures, I may for certain purposes have the diffused foreground pictures predominate or may have the clear-cut and the diffused pictures in equal quantities. Likewise, it will be understood that more than two positions of exposure can be used if desired, and that the resulting pictures can be mingled in any order required. While in most instances, I prefer to focus the camera on the background as shown in the drawings, or on the middle background, I may for certain purposes focus the camera on the middle ground or other plane in the field, but unless a plural-focal lens or special optical image system is employed, it is always preferably focused on a plane at a reasonable distance behind the foreground object plane.

Since the camera is moved on a track parallel to the optical axis of the lens system, the lens will at all times be on the same optical axis and consequently all of the images of the different frames will be properly registered with respect to that axis and to the center of the film. It is also to be remembered that in all of the modifications of my invention, I register one part of an image of one frame with the same part of that image in other frames.

As illustrative of one of the many possible combinations possible, I have shown in Fig. 6 two frames of a film photographed as follows: the upper frame which I term frame 1 has been photographed with the camera in the near position with both the foreground and background in sharp focus, and frame 2 has been photographed with the foreground in focus, but the background diffused. It will also be noted that the size of the foreground F in each frame is the same which is made possible by the compensating lens adjustment disclosed in my said prior patent.

While the photographic operations heretofore described are very effective and materially add to the naturalness of the picture as a whole, and especially add to the plastic relief of foreground figures on off-focus depth planes, I have found that when the lens focus is fixed and held on any one object throughout the successive exposures, that object will not have the same roundness as the other objects in the picture. Although it may appear separated by the depth introduced into other planes, it remains individually relatively flat compared to those other objects which have various image formations among the several frames, this being particularly so when sharp focus is set on a close-up object. This condition is partially corrected by focusing the lens in space between particular planes, but not all scenes can be so focused on, and when living actors or movement exists within the scene, it becomes desirable to have the object of primary attention in predominating clarity of focus while also, of course, producing the plastic effect.

I have found that this combination can be satisfactorily effected in an ordinary camera provided with my adjustable iris by using a plural-focal optical system in connection therewith, in which an area of the lens system is focused most sharply on a near plane and another area of the lens system is focused most sharply on a more distant plane.

While various kinds of plural-focal lens attachments may be used, I prefer to use an optical combination such as illustrated in Figs. 5 and 6 of the drawings. I provide a strip of thin optical glass 12 immediately behind the rearmost element of the lens and in front of the iris. The strip 12 may be attached to the iris mount in any convenient manner, and preferably in vertical position as shown. The width of the strip 12 is materially less than the diameter of the lens, although vertically it covers the lens while leaving the sides R and L thereof uncovered.

As is well known, the insertion of a glass medium in an optical path serves to move the focal point away from the lens which is the equivalent of moving the film closer to the lens. The plate 12 acts to move the focal point of that part of the lens system C aligned therewith back an amount equal to approximately ⅓ of the thickness of the plate 12.

The image, formed by the rays passing through the center of the lens and the strip 12, is focused on a plane behind the plane upon which the images formed by the rays passing through the portions R and L of the lens are focused. The result of this combination is that the rays passing through the center C of the lens form a sharp image of background objects on the film, while the rays passing through the lens sides R and L form sharp images of the foreground objects. Thus in a single exposure through my plural focal lens with the iris wide open, I produce on a single frame a picture consisting of a plurality of images each of which has the objects of a different plane in sharpest focus.

As one example of the many combinations possible with a plural-focal lens and an adjustable iris, I give the following illustrations. Assuming that a cam similar to 52 is used in connection with the iris and a gear train is employed which provides one complete revolution of the cam to every four frames of film exposed, it will be evident that the iris opening will vary in position between circles 6 and 7 as illustrated in Fig. 1. If frame 1 of the film is exposed with the iris expanded, as shown by circle 6, then frame 3 will be exposed with the iris in the contracted position of circle 7. Frames 2 and 4 will be exposed at intermediate positions of the iris aperture. The result will be that frame 1 will bear a compound plural-focal image made up of the three images photographed through the portions C, L, and R of the lens, frame 3 will have a single sharp focus taken only through the portion C of the lens, while frames 2 and 4 will each have images photographed through the portions C of the lens, and lighter images produced through the portions R and L of the lens. Thus it will be seen that when the frames are projected, a composite picture is produced on the screen which has an illusion of natural depth throughout.

While I have described the film of my invention as being produced by a motion picture camera suitable for ordinary action shots, it will be understood of course that my invention is equally applicable to films produced by stop motion photography such as is commonly used in the production of animated cartoons, miniatures, still life, lettered titles, and the like, it being obvious of course that such scenes exhibit adequate depth only when the originals are arranged in spaced planes for the photography, after the fashion of my Patent No. 2,026,713 or otherwise. When employing this type of photography, no special type of apparatus is needed for adjustment or variation of the iris, or for moving the camera as the case may be, since the adjustments may be made manually between exposures. Likewise, I preferably photograph all of the frames directly to a uniform density, irrespective of the variations in the iris aperture. I control the timing to reciprocally vary the duration of exposure by varying the amount of shutter opening for the various exposures to compensate for the variations in aperture size. It will be understood of course that the same range of combinations is possible in stop motion photography as is possible in action photography of the type heretofore dealt with, and that the film of my invention produced by this means is similar to that produced by the methods previously set forth.

While I have given numerous specific examples of my invention, it is to be understood that they are by way of illustration only, and that my invention is not to be restricted thereto, but is to be afforded the full scope of the appended claims.

I claim as my invention:

1. In a cinematographic film strip having spaced along its length a plurality of frames each of which bears a photographic image of predetermined average density of a field having a plurality of planes of depth, a systematic image arrangement for producing an illusion of depth upon projection of said film and comprising two series of said frames, the frames of one of said series being interspersed among the frames of the other of said series in a recurrent order, the images borne by the frames of one of said series having a certain depth of field and the images borne by the frames of the other of said series having a different depth of field, the frames of one of said series predominating in number over the frames of the other of said series.

2. In a cinematographic film strip having spaced along its length a plurality of frames each of which bears a photographic image of predetermined average density of a field having a plurality of planes of depth, a systematic image arrangement for producing an illusion of depth upon projection of said film and comprising two series of said frames, the frames of one of said series being interspersed among the frames of the other of said series in a recurrent order, the images borne by the frames of one of said series having a certain depth of field and the images borne by the frames of the other of said series having a depth of field which is different from and which includes the depth of field of the images formed by the frames of said one series.

3. In a cinematographic film strip having spaced along its length a plurality of frames each of which bears a photographic image of predetermined average density of a field having a plurality of planes of depth, a systematic image arrangement for producing an illusion of depth upon projection of said film and comprising two series of said frames, the frames of one of said series being interspersed among the frames of the other of said series in a recurrent order, the images borne by the frames of one of said series having a certain depth of field and the images borne by the frames of the other of said series having a different depth of field, the images of the foreground of said field being relatively sharp in both of said series.

4. In a cinematographic film strip having spaced along its length a plurality of frames each of which bears a photographic image of predetermined average density of a field having a plurality of planes of depth, a systematic image arrangement for producing an illusion of depth upon projection of said film and comprising two series of said frames, the frames of one of said series being interspersed among the frames of the other of said series in a recurrent order, the images borne by the frames of one of said series having a certain depth of field and the images borne by the frames of the other of said series having a different depth of field, the images of the background of said field being relatively sharp in both of said series.

5. In a cinematographic film strip having spaced along its length a plurality of frames each of which bears a photographic image of predetermined average density of a field having a plurality of planes of depth, a systematic image arrangement for producing an illusion of depth upon projection of said film and comprising at least three series of said frames, the images borne by the frames of one of said series having a certain depth of field, the images borne by the frames of another of said series having a different depth of field, and the images borne by the frames of the remaining series having a further different depth of field, the frames of each of said series being interspersed among the frames of the others of said series in a non-progressive order with respect to the depth of field of the images borne thereby.

6. In a cinematographic film strip having spaced along its length a plurality of frames each of which bears a photographic image of predetermined average density of a field having a plurality of planes of depth, a systematic image arrangement for producing an illusion of depth upon projection of said film and comprising two series of said frames, the frames of one of said series being interspersed among the frames of the other of said series in a recurrent order, the images borne by the frames of one of said series comprising compound plural-focal images made up of a plurality of superimposed elemental images, different ones of said elemental images having different ones of said planes in most critically sharp focus, and the images borne by the frames of the other of said series being single focal and having a single one of said planes in most critically sharp focus.

7. In a cinematographic film strip having spaced along its length a plurality of frames each of which bears a photographic image of predetermined average density of a field having a plurality of planes of depth, a systematic image arrangement for producing an illusion of depth upon projection of said film and comprising two series of said frames, the frames of one of said series being interspersed among the frames of the other of said series in a recurrent order, the images borne by the frames of one of said series comprising compound plural-focal images made up of a plurality of superimposed elemental images in different aspects, different ones of said elemental images having different ones of said planes in most critically sharp focus, and the images borne by the frames of the other of said series being single focal and having a single one of said planes in most critically sharp focus.

8. In a cinematographic film strip having spaced along its length a plurality of frames each of which bears a photographic image of predetermined average density of a field having a plurality of planes of depth, a systematic image arrangement for producing an illusion of depth upon projection of said film and comprising two series of said frames, the frames of one of said series being interspersed among the frames of the other of said series in a recurrent order, the images borne by the frames of one of said series having certain of the planes of said field relatively sharp and displaying a certain contrast between light and dark portions of said field, and the images borne by the frames of the other of said series having some of the last-mentioned planes relatively sharp and others thereof relatively diffused, the images borne by the frames of said other series displaying a contrast between light and dark portions of said field different from that displayed by the images borne by said first series of frames.

9. In a cinematographic film strip having spaced along its length a plurality of frames each of which bears a photographic image of predetermined average density of a field having a plurality of planes of depth, a systematic image arrangement for producing an illusion of depth upon projection of said film and comprising two series of said frames, the frames of one of said series being interspersed among the frames of the other of said series in a recurrent order, the images borne by the frames of one of said series having a certain depth of field and a certain degree of diffusion in the in-focus portion of said images, and the images borne by the frames of the other of said series having a different depth of field and a different degree of diffusion in the in-focus portion of said images.

IVAN MELVILLE TERWILLIGER.